United States Patent [19]

Murakami

[11] 4,340,282

[45] Jul. 20, 1982

[54] LENS SECURING DEVICE

[76] Inventor: Mamoru Murakami, 8-40, Murakuni 2 chome, Takefu, Fukui, Japan

[21] Appl. No.: 205,892

[22] Filed: Nov. 12, 1980

Related U.S. Application Data

[63] Continuation-in-part of Ser. No. 167,120, Jul. 9, 1980.

[30] Foreign Application Priority Data

Oct. 13, 1979 [JP] Japan ............................... 54-141963
Oct. 2, 1980 [GB] United Kingdom ............... 8031760

[51] Int. Cl.³ .......................... G02C 5/00; G02C 1/00
[52] U.S. Cl. ...................................... 351/154; 351/86
[58] Field of Search ................. 351/86, 154; 350/245, 350/252

[56] References Cited

U.S. PATENT DOCUMENTS 2,270,382  1/1942  Nerny ................................. 351/154
2,914,986 12/1959  Zakin ................................. 351/154
3,829,201  8/1974  Whiting ............................. 351/154

Primary Examiner—John K. Corbin
Assistant Examiner—Rodney Borernick
Attorney, Agent, or Firm—Koda and Androlia

[57] ABSTRACT

An elastic strip member is interposed between the inner peripheral surface of a spectacle or sunglass frame and the outer peripheral surface of a spectacle or sunglass lens so as to prevent the lens from colliding with the frame, and further, ridges raised from opposite side surfaces of the strip member are inserted into a groove formed on the inner peripheral surface of the frame and a groove formed on the outer peripheral surface of the lens so as to prevent the lens from falling off the frame.

5 Claims, 11 Drawing Figures

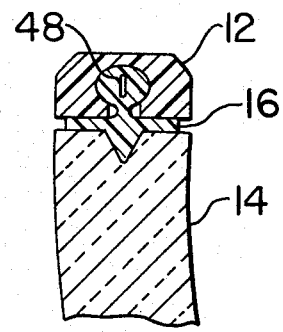
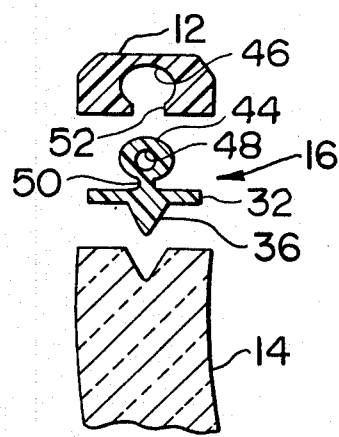

LENS SECURING DEVICE

RELATED APPLICATIONS

This is a continuation-in-part application of Ser. No. 167,120, filed on July 9, 1980.

BACKGROUND OF THE INVENTION

1. Field of the Invention

The present invention relates to a spectacle or sunglass lens securing device for reliably securing a spectacle or sunglass lens to a spectacle frame and a sunglass frame.

2. Description of the Prior Art

Heretofore, as a device for securing a spectacle or sunglass lens (hereinafter referred simply to as the 'spectacle lens') to a spectacle or sunglass frame (hereinafter referred simply to as the 'spectacle frame'), there has been adopted such a device, in which a concave groove for receiving the spectacle lens is formed on the inner peripheral surface of the spectacle frame, while a convex ridge is formed on the outer peripheral surface of the spectacle lens, and both the concave groove and the convex ridge are brought into abutting contact with each other, thus holding the spectacle lens. In this device, in the case of securing the spectacle lens to the frame, extra case should be taken in closely jointing the spectacle lens to the spectacle frame. However, since this securing of the spectacle lens is performed by manual work, which requires highly skilled techniques and is very difficult.

Furthermore, formed between the abuttingly contacting surfaces between the spectacle frame and the spectacle lens is not a little gap, which causes an undesirable movement of the spectacle lens relative to the spectacle frame or fall-off of the spectacle lens from the spectacle frame.

Or, particularly with a circular lens for astigmatism, if the fitting of the spectacle lens into the spectacle frame is unsatisfactorily made, then eyesight may be impaired by an undesirable turn of the spectacle lens.

Further, sweat, dust and the like enter the gap thus formed, whereby the outer peripheral surface of the spectacle lens is soiled, thereby spoiling the visual impression of the spectacle.

Particularly, in the case fitting work is performed, in which the spectacle lens is fitted into the concave groove of the spectacle frame for receiving the lens, if the spectacle frame is made of a rigid material such as a metal material, fitting work of the lens under an excessive pressure may cause an unexpected damage to the spectacle lens.

SUMMARY OF THE INVENTION

This invention has been developed to obviate the abovedescribed problems of the prior art, and has as its object the provision of a spectacle lens securing device, in which a spectacle lens can be readily and reliably secured to a spectacle frame without requiring the skill.

The spectacle lens securing device according to the present invention has a strip member interposed between the outer peripheral surface of the lens and the inner peripheral surface of the frame, and a first ridge carvedly provided at one side of the strip member is inserted into a groove carvedly provided on the inner peripheral surface of the frame and a second ridge provided at the other side of the strip is inserted into a groove carvedly provided on the outer peripheral surface of the lens, so that the lens can be secured to the frame through this strip member.

BRIEF DESCRIPTION OF THE DRAWINGS

Description will hereunder be given of an embodiment of the present invention with reference to the drawings.

FIGS. 10 and 11 are sectional views showing a sixth embodiment of the present invention.

DESCRIPTION OF THE PREFERRED EMBODIMENTS

Figure 1:
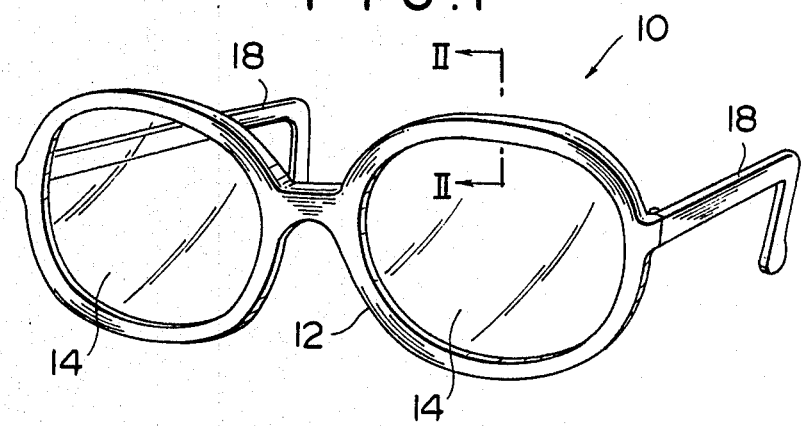
FIG. 1 is a perspective view showing a first embodiment of the present invention.
Figure 2:
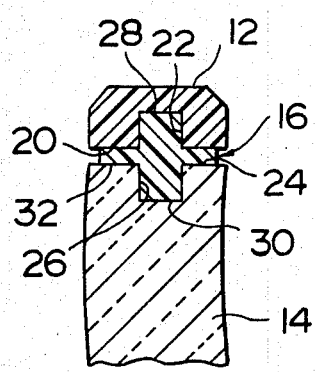
FIG. 2 is a sectional view taken along the line II—II in FIG. 1.

In FIGS. 1 to 5, there are shown the first embodiment of the present invention, in which a spectacle 10 principally comprises a frame 12, lens 14 and a strip member 16 shown in FIG. 2. Extended from opposite portions of the frame 12 are a pair of bows 18 to be hung on ears of a user.

Figure 3:
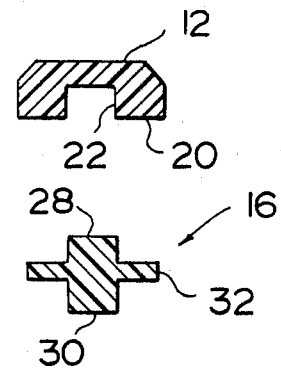
FIG. 3 is a disassembled view of FIG. 2.
Figure 4:
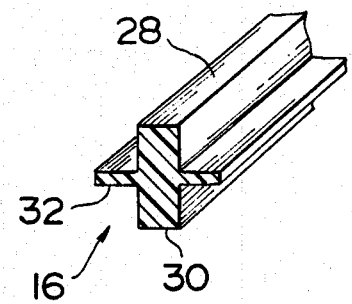
FIG. 4 is a perspective view showing the strip member.
Figure 5:
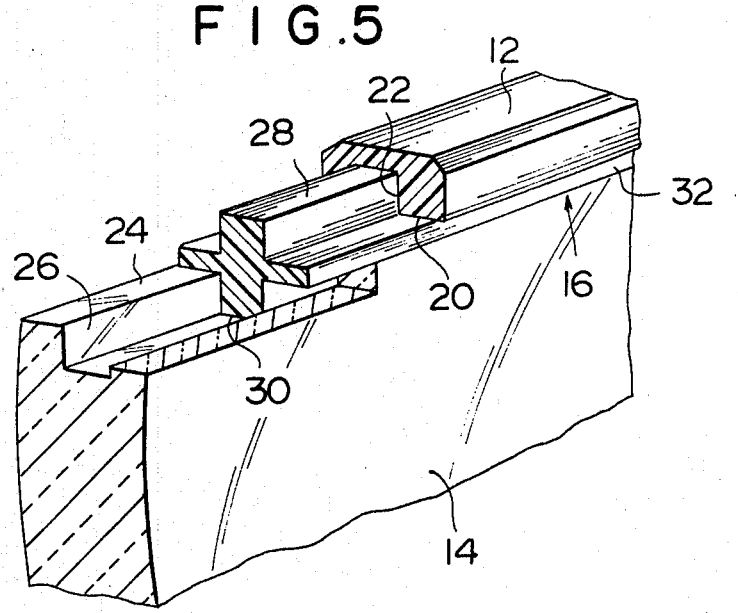
FIG. 5 is a perspective view, partly cut away, showing the fitting condition of the lens.

As shown in FIGS. 2 and 3, a groove 22 being rectangular in cross-section is carvedly provided on the entire inner peripheral surface 20 of an opening for receiving the lens of the frame 12. While, a groove 26 similar to the above one is carvedly provided on the outer peripheral surface 24 of a frame securing portion of the lens 14.

These grooves 22, 26 correspond to a first and a second ridges 28, 30 of the strip member 16. This strip member 16 is made of a synthetic resin material having a given value of elasticity, and constructed such that, in the cross-section perpendicular to the longitudinal direction thereof, a thin plate 32 is provided at one side thereof with a first rectangular ridge 28 and at the other side thereof with a second rectangular ridge 30, said rectangular ridges projecting to opposite directions, respectively. Consequently, the cross-section of the strip member is of a cross shape.

In one example of cross-sectional shape of this strip member, the thin plate 32 has a wall thickness of 0.3 mm, width of 1.5 mm, and each of the ridges 28, 30 has a width of 0.5 mm and height of 0.7 mm. Namely, the width of each of the ridges 28, 30 is designed to be larger than the wall thickness of the thin late 32.

Furthermore, it is desirable that the width of each of the grooves 22, 26 is made slightly smaller than the width of each of the ridges 28, 30, so that the ridges 28, 30 can be press-fitted into the grooves 22, 26 under weak pressure. Furthermore, if necessary, the depth of each of the grooves 22, 26 is made larger than the height of each of the ridges 28, 30, so that the bottoming of the ridges 28, 30 can be prevented.

In assembling the first embodiment of the present invention with the abovedescribed arrangement, the first ridge 28 is inserted into the groove 22 of the frame 12 with the strip member 16 being flexed, and subsequently, the groove 26 of the lens 14 is made to meet with the second ridge 30 of the strip member 16 and the lens 14 is inserted into the inner peripheral portion of the frame 12, while the ridge 30 is being introduced into the groove 26, so that the assembling can be completed as shown in FIG. 1. If an adhesive is applied between the strip member 16 and the frame 12 or between the strip member 16 and the lens 14, the lens can be more firmly secured.

In this assembled condition, as shown in FIG. 2, the dimensions of the elements are determined such that the thin plate 32 of the strip member 16 is brought into contact at one surface thereof with the inner peripheral surface 20 of the frame 12 and at the other surface with the outer peripheral surface 24 of the lens 14. Consequently, no gap is formed between the outer peripheral surface of the lens 14 and the inner peripheral surface of the frame 12, into which sweat, dust and the like intrude, so that the spectacle 10 can be constantly held clean, thereby enabling to maintain the good visual impression. Since the lens 14 is reliably secured to the frame 12, the lens does not turn in the frame even if the lens is of a circular shape.

Since the ridges 28, 30 resist the falling-off force of the lens 14, the lens 14 may not fall off, further, since the thin plate 32 is interposed between the outer periphery of the lens and the inner peripheral surface of the frame, the lens and the frame do not collide with each other, and moreover, perform the shock absorbing function, thus preventing the outer peripheral surface of the lens 14, particularly, the edge from being damaged. Furthermore, if the strip member 16 is colored not only in transparent or white color but also in various colors, an excellent advantages may be offered in design.

Figure 6:
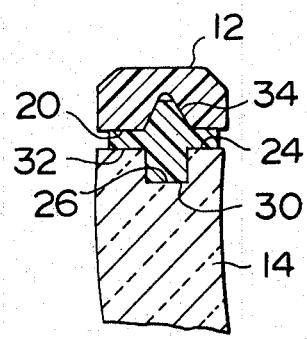
FIGS. 6 to 9 are sectional views showing a second to fourth embodiments of the present invention, corresponding to FIG. 2.

Next, FIG. 6 shows the second embodiment of the present invention, in which, as the first ridge, a ridge 34 being frusto-conical in cross-section is formed. Corresponding to this ridge, the groove 22 of the frame 12 is made to have the same tapering inclinations as that of the ridge 34, so that the ridge 34 can be closely fitted into the groove 22. Since the groove in the frame 12 has heretofore been tapered for directly receiving the outer peripheral surface of the lens in most cases, this embodiment can be readily adoptable.

In this embodiment, the abovedescribed ridges 30 and 34 may be interchangeable in shape with each other, i.e., the cross-section of the ridge 30 may be changed into a frusto-conical one and that of the ridge 34 into a rectangular one.

Figure 7:
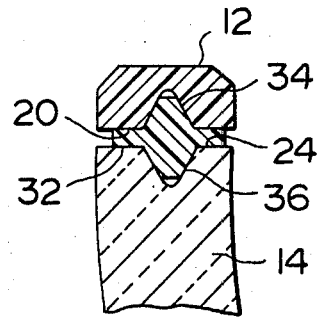

In the third embodiment as shown in FIG. 7, in addition to the first ridge, the second ridge is also formed into a ridge 36 being frusto-conical in cross-section, and the lens 14 has a groove corresponding thereto.

Figure 8:
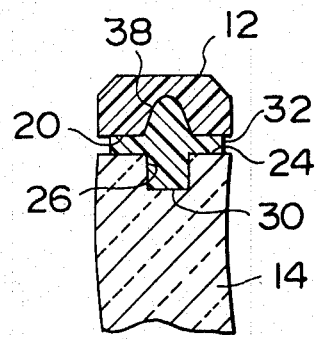

In the fourth embodiment as shown in FIG. 8, the first ridge is formed into a ridge 38 being semi-elliptic in cross-section, which is readily adoptable to the conventional frame provided therein with a groove being semi-elliptic in cross-section for directly receiving the outer peripheral surface of the lens. Additionally, it is also possible to form the second ridge into one being semi-elliptic in cross-section as a matter of cource.

Additionally, the abovedescribed ridges 30 and 38 may be interchangeable in shape with each other, i.e., the cross-section of the ridge 30 may be semi-elliptic one and that of the ridge 38 into a rectangular one.

In addition to the abovedescribed embodiments, the strip member may be made of rubber, leather, metal having elasticity or the like.

Figure 9:
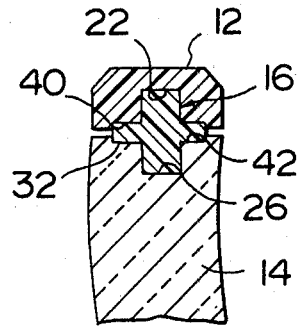

Next, FIG. 9 shows the fifth embodiment of the present invention, in which the strip member has a shape similar to that of the first embodiment. However, shallow grooves 40, 42 are carvedly provided at portions adjacent the openings of the grooves 22, 26 for receiving part of the thin plate 32, whereby the grooves 22, 26 are formed into stepped grooves. In this embodiment with the arrangement as described above, the thin plate can be hardly observed from outside, thus improving the visual impression of the spectacle.

Further, FIG. 10 and FIG. 11 show the sixth embodiment of the present invention, in which a ridge 36 similar to that of the third embodiment shown in FIG. 7 is formed on one side of a strip member 16 for fitting engagement in the groove of a lens 14. Another ridge 44 is also formed on the other side of the strip member 16 for fitting engagement in the groove 46 of a frame 12.

The ridge 44 is generally circular in cross-section and formed with an axial through hole 48 at the center, so that the outer diameter of the ridge 44 can be reduced by the resilient diametrical contraction of the hole 48. The ridge 44 is integrally joined about to the lateral center of a thin plate 32 on one longitudinal side thereof by way of a neck 50 which is smaller in the lateral size than the outer diameter of the ridge 44.

The groove 46 formed in the frame 12 has a cross-section similar in the shape to that of the ridge 44 but slightly smaller in the inner diameter than the outer diameter of the ridge 44. The inner surface of the groove 46 continues to the outer surface of the frame 12 through an elongate opening 52, the lateral gap of which is smaller than the inner diameter of the groove 46 and the outer diameter of the ridge 44 but slightly greater than the outer diameter of the neck 50 of the ridge 44.

This embodiment having the foregoing constitution is assembled in the same manner as in the foregoing embodiments by mounting the lens 14 on the frame 12 while intervening the strip member 16 between the outer peripheral surface of the lens 14 and the frame 12, in which the thin plate 32 functions as a buffer between the lens 14 and the frame 12 and the ridges 36, 44 function as slip-off retainers for the lens 14.

Particularly, since the ridge 44 is retained at the opening 52 from falling-off the groove 46 in this embodiment, it can be mounted securely. Moreover, the ridge 44 can easily pass the opening 52 upon insertion into the groove 46 since the outer diameter of the ridge 44 is decreased resiliently by the diametrical contraction of the axial through hole 48, and can be retained securely from falling-off the groove 46 after the passage since the ridge 44 resiliently recovers its original outer diameter and is held by the opening 52.

Furthermore, the dimensional errors resulted in the inner diameter of the frame 12 can be absorbed by the ridge 44. Paints coated in the finishing step on the frame 12 or synthetic resin plating applied to the frame 12 made of synthetic resin may possibly reduce the inner diameter of the groove 46, but the ridge 44 can tightly be fitted in the groove 46 easily as its outer diameter is decreased by the diametrical contraction of the axial through hole 48. In particular, if the frame 12 is made of metal and it has to be bent in acute angles conforming a specific outer peripheral form of the lens 14, remarkable local reduction may some time occur in the inner diameter of the groove 46, but this embodiment can afford such a significant deformation in the groove 46 due to the decrease in the outer diameter of the ridge 44.

What is claimed is:

1. A spectacle or sunglass lens securing device for holding a lens in an opening of a frame, comprising:
   (a) a groove carvedly provided on the inner peripheral surface of the frame, said groove being substantially circular in cross-section;
   (b) a groove carvedly provided on the outer peripheral surface of the lens; and
   (c) a strip member interposed between the frame and the lens, said strip member comprising:
      a first ridge to be inserted into said groove on the inner peripheral surface of the frame, said first ridge further being substantially circular in cross-section with an axial hole therethrough;
      a second ridge to be inserted into said groove on the outer peripheral surface of the lens; and
      a thin plate portion clamped between the inner peripheral surface of the frame and the outer peripheral surface of the lens;
   whereby said thin plate portion performs the shock absorbing function to protect the lens and the frame from colliding with each other, and said first and second ridges prevent the lens from falling off.

2. The spectacle or sunglass lens securing device as set forth in claim 1, wherein the width of each of said first and second ridges is made larger than the wall thickness of the thin plate portion.

3. The spectacle or sunglass lens securing device as set forth in claim 1, wherein said first and second ridges are press-fitted into the grooves.

4. The spectacle or sunglass lens securing device as set forth in claim 1, wherein said strip member is made of a synthetic resin material having elasticity.

5. A spectacle or sunglass lens securing device according to claim 3, wherein a diameter of said first ridge is larger than the diameter of said groove in said inner peripheral surface of said frame.

* * * * *